Patented Dec. 1, 1931

1,834,812

UNITED STATES PATENT OFFICE

ALBERT IVAN GATES WARREN, OF LONDON, ENGLAND, ASSIGNOR TO BRITISH METALLISING COMPANY, LIMITED, OF LONDON, ENGLAND, A COMPANY OF GREAT BRITAIN

METALLIZING OR COATING SUBSTANCES WITH METALS

No Drawing. Application filed March 1, 1928, Serial No. 258,434, and in Great Britain August 2, 1927.

This invention relates to processes of metallizing or coating electrically non-conducting substances with metals and has for its object to enable an adherent coating of metal to be produced on substances such as manufactured casein, cellulose acetate, vegetable and/or synthetic gums, tortoiseshell, urea and phenol condensation products, and the like, without any necessity for heating the articles treated.

It is known that silver nitrate or silver oxide, when applied to the surface of non-conducting bodies, will form a metallic deposit by the gradual or intentional reduction of the salt to the metallic state, this effect being employed, for instance, in silvering glass.

The present invention, however, is based on the discovery that a pure metallic precipitate of sufficiently fine division can be made to adhere to the surface of a non-conducting body if the latter has a coating produced by the reduction of a metallic salt such as silver nitrate even though the coating produced by the silver nitrate is excessively thin.

The method of coating a non-conducting body according to the present invention consists in applying to the surface of the body a metallic salt such as silver nitrate or gold chloride and also a quantity of the desired elemental metal in the form of a pure finely divided precipitate made up with a suitable carrier in the form of a solution suspension or paste. The salt and elemental body are preferably of the same metal, but the invention is not limited in this respect, for instance, when employing gold chloride as a salt, powdered silver may be used as the paste thickener. The elemental metal may be applied to the surface of the non-conducting body either with the metallic salt or subsequently, the essential condition being that an adherent coating must be formed by the reduction of the metallic salt to enable the elemental metal applied in the form of a solution suspension or paste to adhere to the surface of the non-conducting body.

In carrying the invention into effect according to one form, the body to be coated is first abraded, if necessary, to remove any hard or compact surface or skin, that is, to render the surface more porous, and is then treated with a solution of a metallic salt to produce a preliminary coating.

In order to produce the necessary adherent coating, the treated surface is preferably allowed to stand for some days exposed to light, and during this period the salt of the metal which has been applied to the surface is reduced to the metallic state by the action of formaldehyde, or other aliphatic aldehyde, or furfurol, or other reducing agent, which may be naturally present in the substance to which the coating is applied (as in the case of casein, urea and other manufactured protein products) or which may be applied, or be present in the form of vapor in the room or chamber containing the treated articles. A solution suspension, or paste, of finely divided pure precipitate is then applied to the surface so that it unites with the preliminary coating, this being dried, and finally burnished.

In the application of the process to the production of a coating of silver on manufactured protein products and in the preferred manner, a concentrated aqueous solution of silver nitrate is prepared and to this is added precipitated silver in such quantity as to produce a paste. The paste is applied evenly to the surface to be coated by means of a brush, or in any other convenient manner, and this coating is allowed to stand for some days until the metallic salt has been reduced to the metallic form by the action of formaldehyde, which is present in the coated substance.

In order to hasten the reducing action and shorten the time during which the coating must be allowed to stand, the coated article may be placed in a closed chamber containing vapors of formaldehyde, or other reducing agent, and be subjected to actinic light, or if a reducing agent be latent in the article treated, the reduction effect can be made more evident by gentle warmth. The surface is then dried and burnished.

When it is required to coat with silver non-conducting compounds which are amenable to certain solvents such as cellulose acetate, it is preferred to prepare a solution of silver nitrate in the appropriate solvent and in the case of cellulose acetate employ acetone or other volatile solvent. The solvent solution so prepared is mixed with a quantity of the elemental metal in the form of a pure finely divided precipitate and in such proportions as to produce a thin creamy paste, for example, 10 grammes of silver nitrate are made into a saturated solution with acetone, and to this is added by stirring 50 grammes of metallic silver in powder form. This paste is applied to the surface of the cellulose acetate and after the acetone or other solvent has evaporated the surplus paste is removed from the surface by wiping. The surface thus treated is then exposed to the action of vapors of formaldehyde or other reducing agent in a closed chamber so as to effect reduction of the silver nitrate.

The coatings produced by any of the methods hereinbefore described will be of a dull non-metallic appearance and will require to be treated by burnishing so as to produce a flat and highly conductive non-porous surface. If a heavier coating is required, electro-deposition may then be resorted to.

It is of great importance that the elemental metal which is used in the form of a finely divided precipitate should be pure and of sufficiently fine division.

The degree of division may vary within wide limits, but in order to ensure satisfactory results the precipitate should be sufficiently finely divided to pass freely through a 200 x 200 per sq. inch mesh.

In forming the paste and when employing volatile reagents, it is preferable to add a small quantity of an inert colloid material to assist in keeping the metallic particles in suspension. The colloid may take the form of a vegetable starch such as rice, agar agar, or cellulose acetate, or rubber latex or the like.

I claim:—

1. A method of coating electrically non-conducting material with a metal, which consists in coating the surface of said material with a metallic salt and a powderous metallic precipitate of a similar metal, subjecting the surface to a metallic salt reducing agent, and drying the surface.

2. A method of coating electrically non-conducting material with a metal, which consists in coating the surface of said material with a metallic salt and a powderous metallic precipitate of a similar metal, subjecting the surface to a metallic salt reducing agent, drying the surface, and subjecting said surface to an electrolytic action to deposit thereon a metallic layer.

3. A method of coating electrically non-conducting material with a metal, which consists in coating the surface of said material with a metallic salt and a powderous metallic precipitate of a similar metal, subjecting the surface to a metallic salt reducing agent, and drying the surface, said reducing agent being formaldehyde.

4. A method of coating electrically non-conducting material with a metal, which consists in coating the surface of said material with a metallic salt and a powderous metallic precipitate of a similar metal, subjecting the surface to a metallic salt reducing agent, and drying the surface, said metal being silver and said reducing agent being formaldehyde.

5. A method of coating electrically non-conducting material with a metal, which consists in coating the surface of said material with a metallic salt and a powderous metallic precipitate of a similar metal, subjecting the surface to a metallic salt reducing agent, drying the surface, and burnishing said surface.

6. A method of coating electrically non-conducting material with a metal, which consists in coating the surface of said material with a metallic salt and a powderous metallic precipitate of a similar metal, subjecting the surface to a metallic salt reducing agent, drying the surface, subjecting said surface to an electrolytic action to deposit thereon a metallic layer, and burnishing said surface.

7. A method of coating synthetic resin which consists in surfacing the same with a metallic salt and with a metallic precipitate, subjecting the surface to a metallic salt reducing agent, and in drying the surface.

8. A method of coating synthetic resin which consists in surfacing the same with a metallic salt and with a metallic precipitate, subjecting the surface to a metallic salt reducing agent, in drying the surface, and in burnishing said surface.

9. A method of coating a base having metal-reducing properties, which comprises coating the surface of the base with a metallic salt and a metallic precipitate, subjecting the surface to the action of a metallic salt reducing agent and in drying the surface and burnishing the surface.

In witness whereof I affix my signature.

ALBERT IVAN GATES WARREN.